United States Patent [19]

Watanabe

[11] Patent Number: 5,387,561
[45] Date of Patent: Feb. 7, 1995

[54] TITANIUM CARBIDE/NITRIDE-ZIRCONIUM OXIDE-BASED HIGH-TOUGHNESS CERAMICS

[75] Inventor: Tadahiko Watanabe, Tosu, Japan

[73] Assignee: Agency of Industrial Science and Technology, Tokyo, Japan

[21] Appl. No.: 134,741

[22] Filed: Oct. 12, 1993

[30] Foreign Application Priority Data

Oct. 12, 1992 [JP] Japan .................................. 4-300345

[51] Int. Cl.⁶ ........................ C04B 35/56; C04B 35/58
[52] U.S. Cl. ........................................ 501/87; 501/96; 501/103
[58] Field of Search ............................. 501/87, 96, 103

[56] References Cited

U.S. PATENT DOCUMENTS

| | | | |
|---|---|---|---|
| 4,598,053 | 7/1986 | Yamakawa et al. | 501/96 X |
| 4,704,372 | 11/1987 | Watanabe et al. | |
| 4,948,425 | 8/1990 | Watanabe et al. | |
| 5,068,072 | 11/1991 | Horinouchi et al. | 501/103 X |
| 5,143,869 | 9/1992 | Watanabe et al. | 501/87 |

FOREIGN PATENT DOCUMENTS 4-104957 4/1992 Japan .

*Primary Examiner*—Karl Group
*Attorney, Agent, or Firm*—Oblon, Spivak, McClelland, Maier & Neustadt

[57] ABSTRACT

Titanium carbide/nitride-zirconium oxide-based ceramics having high density, strength and toughness suited for cutting and wear-resisting tools heated above 200° C. and containing tetragonal zirconium oxide that is stabilized to eliminate the susceptibility to thermal deterioration without the use of yttrium oxide or other conventional stabilizers. The titanium carbide/nitride-zirconium oxide-based ceramics are prepared by sintering a powdery mixture consisting of basic components of 90 to 10% by weight of titanium carbide and titanium nitride containing carbon and nitrogen in the mole ratios of 1:9 to 9:1 and 10 to 90% by weight of monoclinic zirconia or by adding 1 to 10% by weight of the total weight of the mixture of either or both of titanium and titanium oxide to the above basic components.

6 Claims, No Drawings

TITANIUM CARBIDE/NITRIDE-ZIRCONIUM OXIDE-BASED HIGH-TOUGHNESS CERAMICS

FIELD OF THE INVENTION

This invention relates to titanium carbide/nitride-zirconium oxide-based high-toughness ceramics, and more particularly to titanium carbide/nitride-zirconium oxide-based ceramics having high density, strength and toughness suited for cutting tools and machinery parts requiring high wear resistance.

DESCRIPTION OF THE PRIOR ART

In the preparation of conventional titanium carbide/nitride-zirconium oxide-based ceramics, stabilizers consisting essentially of yttrium oxide have been added to keep zirconium oxide in a stable or metastable tetragonal form (as disclosed in, for example, Japanese Provisional Patent Publication No. 104957 of 1992). On the other hand, continuous search has been made for cheaper stabilizers to substitute for expensive yttrium oxide. When yttrium oxide is added, in addition, tetragonal zirconium oxide becomes susceptible to thermal deterioration and transforms to a monoclinic form. Prevention of this tetragonal-to-monoclinic transformation of zirconium oxide has been difficult to achieve as it necessitates the reduction of zirconium oxide to extremely small particles or the use of other stabilizers than yttrium oxide.

To overcome these difficulties, efforts have been made to manufacture composite ceramics consisting of tetragonal zirconium oxide stabilized by yttrium oxide and titanium carbide or nitride having higher resistance to thermal deterioration and, in particular, properties suited for high-toughness cutting and wear-resisting tools that are heated above 200° C. However, little success has been achieved in these efforts as monoclinic zirconium oxide has been considered untransformable to a stable tetragonal form without the addition of yttrium oxide, magnesium oxide or calcium oxide.

In this connection, the inventor discovered that the addition of titanium boride partially stabilizes zirconium oxide, changing its crystal form from monoclinic to tetragonal (Japanese Patent Publication No. 7668 of 1984). Subsequent studies revealed that this partial stabilization is due to the forming of a solid solution of titanium in zirconium oxide.

The inventor also conducted an experiment based on an assumption that the addition of titanium carbide and titanium nitride would also produce stable tetragonal zirconium oxide that has conventionally been considered to be unobtainable with other stabilizers than a few including yttrium oxide. The experiment revealed that the addition of titanium carbide and titanium nitride brings about partial stabilization of zirconium oxide, which proved to be furthered by the addition of titanium or titanium oxide.

Through studies on the improvement of the characteristics of titanium carbide/nitride-zirconium oxide-based ceramics, the inventor discovered that even monoclinic zirconium oxide is stabilized when sintered and the stabilization of monoclinic zirconium oxide is furthered by the addition of titanium or titanium oxide.

SUMMARY OF THE INVENTION

The object of this invention, which is based on the knowledge described above, is to provide titanium carbide/nitride-zirconium oxide-based ceramics having high density, strength and toughness suited for cutting and wear-resisting tools heated above 200° C. prepared from tetragonal zirconium oxide stabilized without the use of yttrium oxide or other conventional stabilizers.

To achieve this object, the titanium carbide/nitride-zirconium oxide-based ceramics according to this invention are prepared by sintering mixed powders of (A) 90 to 10% by weight of titanium carbide and titanium nitride powders containing carbon and nitrogen in the mole ratios of 1:9 to 9:1 and (B) 10 to 90% by weight of monoclinic zirconium oxide.

The basic components of (A) and (B) may also be sintered together with (C) either or both of titanium and titanium oxide powders which constitute 1 to 10% by weight of the total weight of the obtained mixture.

In the ceramics made from the materials just described, titanium carbide and titanium nitride transform part of zirconium oxide into stable tetragonal crystals that impart high fracture toughness, while residual monoclinic zirconia also contributes to the enhancement of toughness.

When sintered at temperatures of approximately 1500° C., zirconium oxide transforms from monoclinic to tetragonal with the particles thereof contracting while those of titanium carbide and titanium nitride expand. Tetragonal zirconium oxide then sinters (combines) with titanium carbide and titanium nitride. On subsequent cooling, part of monoclinic zirconium oxide transforms back to tetragonal zirconium oxide with an accompanying expansion in volume. Because tetragonal zirconium oxide is combined with titanium carbide and titanium nitride, great strains are built up in the transformed monoclinic zirconium oxide. The resulting slight microcracks formed between the particles of titanium carbide and titanium nitride and those of monoclinic zirconium oxide are considered to contribute to the enhancement of toughness.

When yttrium oxide is added as a stabilizer, by comparison, a solid solution of yttrium oxide is formed in zirconium oxide first. As the resulting powder of zirconium oxide is then mixed and sintered with titanium carbide and titanium oxide, yttrium oxide firmly transforms zirconium oxide into stable tetragonal crystals. Therefore, the aforementioned transformation of zirconium oxide from tetragonal to monoclinic seldom occurs. Consequently, the enhancement of toughness by the strains built up in the monoclinic crystals of zirconium oxide is unexpectable.

The high toughness resulting from the sintering of a mixture of titanium carbide, titanium oxide and monoclinic zirconium oxide is primarily due to the strains induced by the difference in the thermal expansion coefficients of the individual components and supplementarily due to the phase transformation from tetragonal to monoclinic. Therefore, the toughness of the wear-resisting and cutting tools made of the resultant ceramics remains unaffected even when they are exposed to temperature variations over a range of approximately 200° C.

The mole ratio ($\alpha:\beta$) of carbon to nitrogen in the main component (A) of this invention is limited between 1:9 and 9:1 because the resultant ceramics cannot acquire high enough wear resistance against steel outside these limits. Either titanium carbide and titanium nitride of a given mole ratio or those of two or more different mole ratios may be used. The mean particle size of titanium carbide and titanium nitride powders should be not larger than 5 μm, preferably not larger than 1 μm.

The mean particle size of the monoclinic zirconium oxide powder used as component (B) should also be not larger than 5 μm preferably not larger than 1 μm. The addition of monoclinic zirconium oxide should be limited between 10 and 90% by weight of the total weight of the mixture, preferably between 30 and 80% by weight. While titanium carbide and titanium nitride do not become compact when their addition is under 10% by weight, they do not exhibit their characteristics above 90% by weight.

When added in percentages exceeding 10% by weight, titanium and titanium oxide constituting component (C) remain in the sintered product to lower the mechanical properties thereof. The mean particle size of titanium and titanium oxide powders should be not larger than 5 μm, preferably not larger than 1 μm.

When component (C) is added, the effect of this invention remains unimpaired even if the lower limit of titanium carbide and titanium nitride addition is lowered to 5% by weight.

The ceramics according to this invention are prepared by processing mixtures of the components described before by conventional methods. For example, a mixture of component powders is filled in a graphite hot-press crucible for sintering in a vacuum or in a neutral or reducing atmosphere of argon or hydrogen, under a die pressure of 50 to 300 kg/cm2, at a temperature of 1300° to 2000° C. and for a period of 10 to 200 minutes.

Monoclinic zirconium oxide containing a preformed solid solution of titanium or titanium oxide may be mixed and sintered with powders of titanium carbide and titanium nitride.

As described above, this invention provides titanium carbide/nitride-zirconium oxide-based ceramics having high density, strength and toughness suited for cutting and wear-resisting tools heated above 200° C. and containing tetragonal zirconium oxide that is stabilized to eliminate the susceptibility to thermal deterioration without the use of yttrium oxide or other conventional stabilizers.

DESCRIPTION OF THE PREFERRED EMBODIMENTS

Preferred embodiments of the ceramics according to this invention are described below.

Powders containing different proportions of titanium carbide, titanium nitride and zirconium oxide shown in the composition column of Table 1 were thoroughly mixed. The obtained mixtures were sintered into ceramics in a vacuum in a graphite crucible for one hour at the temperatures shown in Table 1. Table 1 shows the condition of pores, fracture toughness KIC, bending strength, Vickers hardness and other properties of the individual ceramics prepared. The specimens with asterisked numbers were taken from conventional products for the purpose of comparison. In the table, mZrO2 indicates monoclinic zirconium oxide.

As is obvious from Table 1, all sintered ceramics according to this invention exhibited excellent toughness. The ceramics containing 30 to 80% mZrO2 exhibited particularly superior toughness. The addition of titanium or titanium oxide showed a tendency to increase fracture toughness KIC to some extent.

The bending strength of the sintered ceramics according to this invention remained unchanged even after they had been heated to 250° C. for long times.

| Specimen No. | Composition (% by weight) | Sintering Temperature (°C.) | Pores | Fracture Toughness $K_{IC}$ (MPa-m$^{\frac{1}{2}}$) | Bending Strength (MPa) | Vickers Hardness | Remarks |
|---|---|---|---|---|---|---|---|
| 1* | Ti (C,N) | 1600 | Many | | | | Unsintered |
| 2 | Ti (C,N)-10 wt % mZrO$_2$ | 1600 | Rare | 5 | 400 | 1400 | Sintered |
| 3 | Ti (C,N)-25 wt % mZrO$_2$ | 1600 | Rare | 5 | 400 | 1400 | Well sintered |
| 4 | Ti (C,N)-30 wt % mZrO$_2$ | 1600 | None | 6 | 600 | 1400 | " |
| 5 | Ti (C,N)-40 wt % mZrO$_2$ | 1600 | None | 7 | 700 | 1500 | " |
| 6 | Ti (C,N)-60 wt % mZrO$_2$ | 1600 | None | 8 | 800 | 1500 | " |
| 7 | Ti (C,N)-80 wt % mZrO$_2$ | 1600 | None | 8 | 800 | 1400 | " |
| 8 | Ti (C,N)-90 wt % mZrO$_2$ | 1600 | None | | | | Sintered but susceptible to cracking |
| 9 | 100 wt % mZrO$_2$ | 1600 | | | | | Sintered but cracked |
| 10 | Ti (C,N)-40 wt % mZrO$_2$-1 wt % TiO$_2$ | 1700 | None | 9 | 700 | 1500 | Well sintered |
| 11 | Ti (C,N)-40 wt % mZrO$_2$-5 wt % TiO$_2$ | 1600 | None | 9 | 700 | 1500 | " |
| 12 | Ti (C,N)-40 wt % mZrO$_2$-5 wt % Ti | 1600 | None | 9 | 700 | 1500 | " |
| 13 | Ti (C,N)-40 wt % mZrO$_2$-5 wt % Ti$_2$O$_3$ | 1600 | None | 9 | 700 | 1500 | " |
| 14 | Ti (C,N)-40 wt % mZrO$_2$-5 wt % TiO | 1600 | None | 9 | 700 | 1500 | " |
| 15 | Ti (C,N)-40 wt % mZrO$_2$-10 wt % TiO$_2$ | 1600 | None | 7 | 500 | 1300 | " |
| 16 | Ti (C,N)-90 wt % mZrO$_2$-5 wt % TiO$_2$ | 1600 | None | 9 | 700 | 1300 | " |

What is claimed is:

1. A titanium carbide/nitride-zirconium oxide-based high-toughness ceramic prepared by sintering a powdered mixture consisting of 90 to 10% by weight of titanium carbide and titanium nitride containing carbon and nitrogen in the mole ratios of 1:9 to 9:1 and 10 to 90% by weight of monoclinic zirconia.

2. A titanium carbide/nitride-zirconium oxide-based high-toughness ceramic prepared by sintering a powdered mixture consisting of 1 to 10% by weight of the total weight of the mixture of either or both of titanium and titanium oxide added in admixture to basic components consisting of 90 to 5% by weight of titanium carbide and titanium nitride containing carbon and nitrogen in the mole ratios of 1:9 to 9:1 and 10 to 95% by weight of monoclinic zirconia.

3. A titanium carbide/nitride-zirconium oxide-based high-toughness ceramic according to claim 1 or 2, in which the mean particle size of titanium carbide and titanium nitride powders is not larger than 5 μm.

4. A titanium carbide/nitride-zirconium oxide-based high-toughness ceramic according to claim 1, in which monoclinic zirconia is present in an amount of 30 to 80% by weight the total weight of the obtained mixture.

5. A titanium carbide/nitride-zirconium oxide-based high-toughness ceramic according to claim 2, in which monoclinic zirconia is present in an amount of 40 to 90% by weight of the total weight of the obtained mixture.

6. A titanium carbide/nitride-zirconium oxide-based high-toughness ceramic according to claim 2, in which the mean particle size of either of titanium and titanium oxide added is not larger than 5 μm.

* * * * *